July 20, 1937.　　　M. F. LEACH　　　2,087,601
AUTOMATIC OILING DEVICE
Filed Nov. 19, 1934
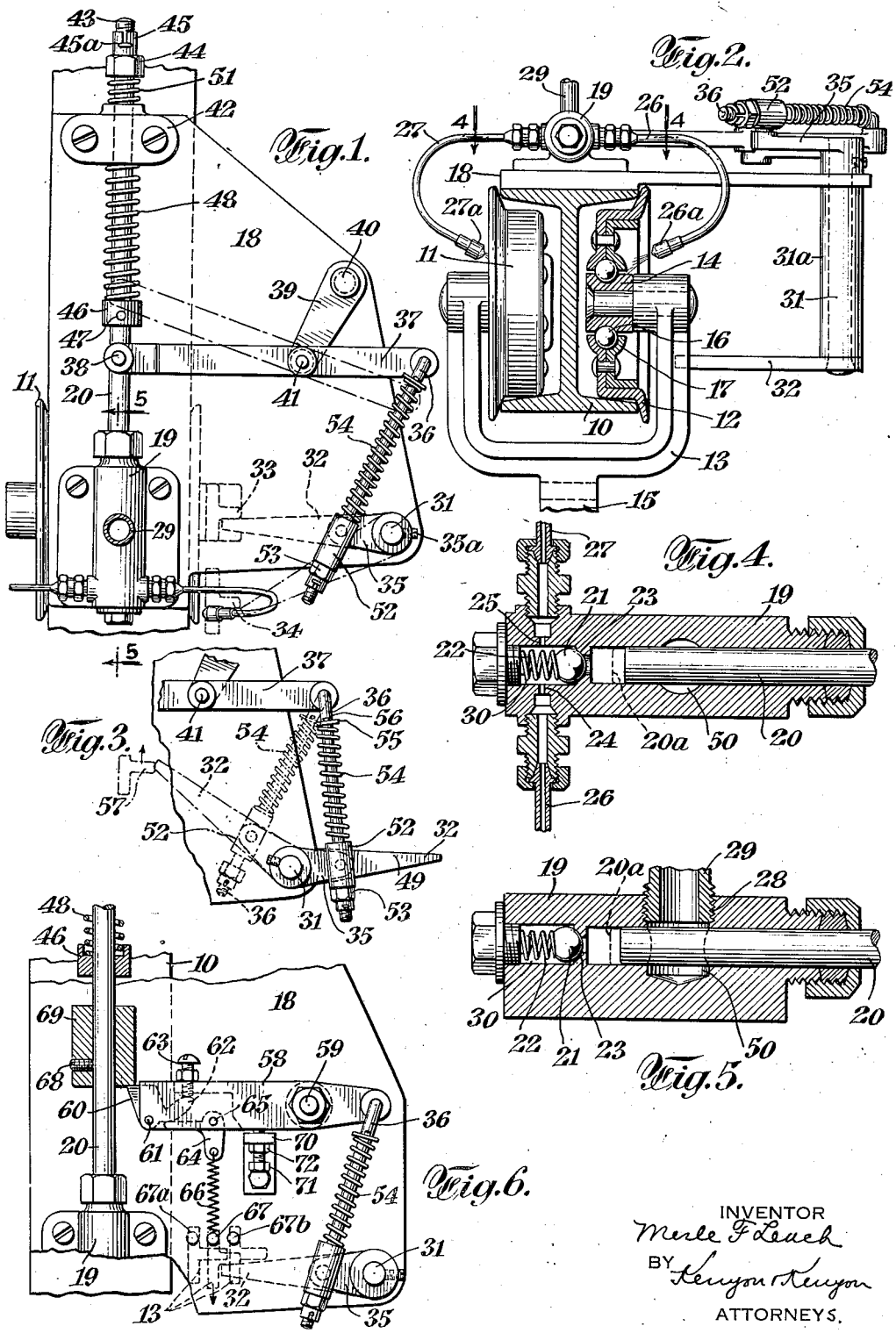
INVENTOR
Merle F Leach
BY Kenyon & Kenyon
ATTORNEYS.

Patented July 20, 1937

2,087,601

UNITED STATES PATENT OFFICE 2,087,601

AUTOMATIC OILING DEVICE

Merle F. Leach, Yorktown Heights, N. Y.

Application November 19, 1934, Serial No. 753,625

19 Claims. (Cl. 184—3)

This invention relates to an automatic intermittent lubricating mechanism for machinery, and in the particular embodiment thereof here described such mechanism is shown in a form adapted for the lubrication of the supporting wheels for an overhead conveyor system.

Among the objects to which this invention is directed is the provision of an automatic intermittent lubricating mechanism adapted to be actuated by movement of a part to be lubricated or some part associated therewith past an oiling station, and arranged to eject a measured quantity of oil from a spout or nozzle adjacent, or to propel the same through a pipe to, the part to be oiled as it passes the oiling station. According to this invention, improved means are afforded for avoiding the expense, wastefulness and ineffectiveness of hand oiling.

This application is a continuation in part of my copending application Ser. No. 697,609, filed November 11, 1933, for Automatic oiling device.

Certain features of the invention described herein relate to improved means for actuating and controlling the plunger of a plunger-actuated lubricating mechanism upon movement of a member of apparatus having a part to be lubricated relative to the lubricating mechanism. Thus a feature of my present invention relates to resilient stop means for the oil measuring and ejecting plunger so that there is decreased wear and tear on the parts and so that likewise any tendency for the oil to drip from the nozzles is lessened.

Further advantages of this invention relate to novel means whereby a member of apparatus having a part to be lubricated can be moved relative to the oiling device in one direction to cause oil to be ejected on the part to be lubricated and is likewise permitted to move in the opposite direction past the oiling device without causing damage or breakage to the oiling device by a novel arrangement of levers and yieldable means especially adapted as will be described below to the type of oiling device disclosed herein. This means is preferably used in combination with another feature of this invention, namely, means whereby the tripping lever which causes the oil to be ejected on to the part to be lubricated may be swung out of the way to inoperative position by a motion which does not cause ejecting of oil. Further features and advantages of this invention relate to means for causing the device to be actuated at the time that the oil nozzle is in proper position with respect to a moving part to be lubricated notwithstanding the existence of protruding parts of different sizes on the members of the apparatus having a part to be lubricated which would otherwise cause improper synchronization in actuating the lubricating device.

A further feature of the present invention resides in providing a reservoir of such character that the oil is ejected in accurately measured amounts notwithstanding the rapid motion of the ejecting plunger.

In the description which follows the device will be disclosed in connection with the lubrication of an overhead conveyor system comprising a yoke and two wheels engaging opposite sides of an I-beam rail, and more particularly in connection with the oiling of such apparatus where the part to be oiled consists of ball bearings running in a ball race forming the supporting bearings for each of these wheels. It will be distinctly understood, however, that the invention is not limited in its application to the oiling of any particular type of moving machinery but is adapted to the lubrication of any type or kind of machinery in which a plurality of parts to be lubricated are lubricated by movement of a member or members of such machinery relatively to a lubricating mechanism.

Further features, advantages and purposes of this invention will be apparent in connection with the following description of the accompanying drawing forming part of this specification wherein Fig. 1 is a plan view of an oiling device embodying this invention.

Fig. 2 is an end view of the device with the I-beam and a carrier wheel shown in section.

Fig. 3 is a plan view showing the tripping lever in various positions.

Fig. 4 is a horizontal section of the measuring cylinder on the line 4—4 of Fig. 2.

Fig. 5 is a vertical section of the measuring cylinder on the line 5—5 of Fig. 1.

Fig. 6 is a plan view similar to Fig. 1 of a modified form of a lubricating device embodying this invention.

In the groove on each side of the I-beam rail 10 are mounted for longitudinal movement thereof wheels 11 and 12. A yoke 13 provided with bearings 14 for the wheels 11 and 12 secures the wheels in fixed relation with respect to each other, the whole constituting a traveling carriage and provides means 15 for the support of an article to be conveyed and, if desired, a driving connection for the carriage. Ball bearings 16 within a ball race 17 are mounted upon bearings 14 and furnish the support for the wheels 11 and 12.

It is common in factories, such for example as assembly plants, to provide one or more rails such as I-beam 10 and to mount thereon a substantial number of traveling carriages such as the yoke 13 and its associated wheels 11 and 12. There may be more than one hundred such carriages. In many instances successive carriages are coupled or linked together, and a large number of them are moved slowly along the rail at a constant rate of speed by appropriate driving means. The present description which illustrates certain embodiments of this invention is directed chiefly to the disclosure of improved features of automatic lubricating apparatus for such a conveyor system.

Upon the top of the rail or beam 10 is mounted a supporting plate 18 projecting to some extent laterally of the rail. Such plate is secured to the rail by welding by bolts or otherwise. Upon plate 18 is mounted a cylinder 19 or other part having a bore with a plunger 20 therein adapted to move longitudinally of the bore. At one end of the cylinder is an outlet chamber 30 in which is positioned a ball 21 held by a spring 22 against a seat 23. The spring, ball and seat provide a one-way valve permitting oil to flow from the cylinder to chamber 30, closing when pressure within the cylinder is reduced. The constricted portion of said bore, part of which affords said valve seat, acts as an outlet port of said bore.

At the discharge side of this valve are two ports 24 and 25 communicating respectively with pipes 26 and 27. These pipes are preferably made of bendable copper and may, if desired, be provided with detachable nozzles 26a and 27a respectively. In the device here shown the pipes 26 and 27 are bent downwardly and inwardly on each side of the rail so that the nozzles approach as nearly as may be the ball race where the oil is to be applied. The discharge nozzles of these pipes must be so positioned that they will clear all moving parts of the mechanism to be oiled. These nozzles are detachable for cleaning and for substituting other nozzles of different orifice in case it is desired to change the size of the stream of oil to be ejected on the part to be oiled. The cylinder 19 is provided with an inlet port 28. The port 28 is at the mouth of a reservoir 50 which is adapted to contain a volume of oil which may be ejected from the cylinder as will be hereinafter described. The reservoir preferably holds enough oil to fill the portion of the bore between the reservoir and the outlet port and likewise preferably has a greater diameter across the bore of the cylinder than the diameter of the bore. The plunger 20, which is actuated by mechanism that will be described below, is adapted to reciprocate longitudinally within the cylinder 19 and to be retracted so that the end thereof comes within and preferably passes through the reservoir 50. The arrangement of parts is such that as the plunger moves outwardly from the one-way valve on its suction stroke, the one-way valve is closed and a vacuum is created within the cylinder. Further movement of the plunger 20 in the same direction causes the end thereof to come within the reservoir 50 so that oil from the reservoir will immediately flow into the portion of the bore of cylinder 19 from which the plunger has just been withdrawn. A pipe 29 attached to the mouth 28 of reservoir 50 is connected to a source of oil (not shown) and is adapted to keep the reservoir 50 filled with oil.

In the foregoing apparatus is is apparent that the length of travel of the plunger 20 from the wall of reservoir 50 toward the one-way valve determines the quantity of lubricant that is ejected from the device. Thus a proper quantity of lubricant is drawn from a source of supply and is accurately measured. It makes no difference how far the plunger 20 is retracted within the cylinder since an excess of oil drawn into the reservoir 50 by an overthrow of the plunger will be re-expelled through the feed device on the return stroke of the plunger. The strength of the spring 22 forming a part of the one-way valve is so adjusted as to insure that excess oil beyond the predetermined measured amount will be forced out through the inlet pipe. The one-way valve will not open until the plunger has traveled far enough on its forward stroke to close the portion of the bore of cylinder 19 between the check valve and the reservoir 50. The quantity of oil remaining within the cylinder when such excess has been returned to the inlet pipe is the largest quantity required for the lubrication purpose to which the device is adapted and this quantity is determined by the size and shape of the bore of the cylinder and the distance of the reservoir from the outlet end of the cylinder. Within the limits established by these dimensions, the desired quantity of oil to be expelled from the cylinder on each forward stroke of the plunger may be adjustably determined by positioning the adjusting nut 44 referred to below.

When the plunger 20 on its forward stroke has passed through the reservoir 50, further forward movement of the plunger increases the pressure on the measured charge of oil in the bore of the cylinder and under the influence of such pressure the spring 22 compresses and ball 21 lifts from its seat 23, permitting the charge of oil to flow into chamber 30 and to be forced outwardly through ports 24 and 25 and through pipes 26 and 27 upon the part or parts to be oiled.

It is a feature of the embodiment of this invention herein described that means are afforded for retracting the plunger 20 after the measured quantity of oil has been discharged from the device. In the illustration of this invention shown in the accompanying drawing, the means for actuating the plunger to expel oil from the device includes spring 48. In addition to this spring, a spring 51 is interposed between the adjusting nut 44 and a guideway 42 secured to plate 18. As will be described more in detail below, the spring 48 is adapted to move the plunger 20 rapidly toward the one-way valve at the end of the cylinder 19 to discharge a measured quantity of oil. The spring 51 is of such a character as to oppose spring 48 during the latter part of the movement of plunger 20 under the influence of spring 48. When spring 48 has moved the plunger 20 toward the one-way valve at the end of cylinder 19, the inertia of the plunger 20 and associated parts moving therewith is sufficient to carry the end of the plunger 20 to the position 20a shown in dotted lines in Figs. 4 and 5. However, when the plunger has been moved to this position, the force of spring 48 will have been largely expended and the energy in spring 51 will have been built up so that spring 51 becomes adapted to move the plunger rearwardly a slight distance so that the end of plunger 20 is in the position shown in solid lines in Figs. 4 and 5. The position of the plunger shown in solid lines is the normal position of the plunger when the device is not being operated. With this mechanism the discharge of the oil is very rapid and at the end of the discharge stroke of the plunger the pressure on the oil is immediately relieved and a suction applied, thereby practically instantaneously closing the one-way valve so as to cut off further flow of lubricant. This is helpful in avoiding any dripping of oil from the nozzles 26a and 27a after oil has been discharged from these nozzles in lubricating the bearings on the moving apparatus to be lubricated. Furthermore, the spring 51 acts to cushion the stroke of plunger 20 so that wear and tear on the apparatus and objectionable noise are lessened.

The actuating mechanism for the plunger 20 is as follows: A shaft 31 is journaled within a downwardly projecting sleeve 31a secured to a laterally extending portion of the plate 18. On the lower end of this shaft is secured a trip arm 32 adapted to engage a member of the moving apparatus having a part to be oiled. In the instance here described, the trip arm 32 is arranged to be engaged when in operative position by the yoke 13 of the traveling carriage. Such engagement first occurs when the yoke of the traveling carriage is at a point prior to its arrival at the oiling station as indicated at 33 in Fig. 1. The arrangement is such that a movement of the yoke along the rail 10 after the yoke has engaged the trip arm 32 will deflect this arm from the position of initial engagement to the position indicated at 34 in Fig. 1, namely, until the arm 32 has been moved out of the path of travel of the yoke so that the arm 32 will then be free to return under the influence of spring 48 to its normal operative position. At this instant the part to be oiled has reached the oiling station. Such deflection of the trip arm 32 causes it to move pivotally about the center of the shaft 31 and to rotate shaft 31 to a corresponding extent.

Upon the upper end of shaft 31 and in operative position arranged to project inwardly above the upper face of plate 18 is mounted an arm 35 adapted to be secured in adjusted position on shaft 31 by set screw 35a. Set screw 35a is the means whereby the angular relation between arm 32 and arm 35 may be adjustably fixed, and whereby arm 32 may be caused to project, at will, either a greater or a lesser distance into the path of travel of the moving parts to be oiled, when in its normal position, and likewise permits adjustment or timing of the moment of discharge of the oil. The free end of arm 35 is pivotally secured to a collar 52 on link 36. The collar 52 is slidable on the link 36 and is held from moving off the end of link 36 by means of a nut 53 which is preferably provided with some locking arrangement such as slots suitable for the reception of a cotter pin passing through a hole in the link. Between the collar 52 and other end of the link 36 is a coil spring 54 which is held under compression by means of a stop 55 held on link 36 by suitable means such as a pin 56. The other end of link 36 is pivotally secured to one end of lever 37, which lever is forked at its opposite end to engage pivotally through pin 38 a continuation of plunger 20. A link 39 pivotally mounted upon pin 40 secured to plate 18 is pivotally secured by pin 41 to lever 37 near, but not necessarily at, the midpoint thereof.

The arrangement is such that rotation of the shaft 31 in a counter-clockwise direction (as shown in Fig. 1) causes the collar 52 by coaction with stop nut 53 and link 36 to depress the outer or right hand end of lever 37 and raise the inner forked end of lever 37 and thereby partially withdraw plunger 20 within cylinder 19. The arrangement of parts is such that the plunger 20 is retracted so that the end thereof is within the reservoir 50 and so that the measuring part of cylinder 19 can be quickly filled with lubricant. Moreover, the system of linkage above described is such that lever 37 has a floating fulcrum and accordingly the motion it imparts to plunger 20 is in a straight line and not on the arc of a circle.

If the carrier should be moved past the oiling mechanism in a direction opposite to the direction of movement of the carrier adapted to cause discharge of oil as above described, it is to be noted (as shown in Fig. 3) that the trip arm 32 is yieldably mounted so that it can rotate sufficiently to permit the yoke 13 to pass thereby without breaking or otherwise interfering with the apparatus and without substantially moving lever 37. In Fig. 3 the yoke is shown as having been moved in a direction the reverse of its normal movement and to the position shown at 57 and in such case the collar 52 slides up the link 36 so as to permit this motion. After the yoke 13 has gone by the position 57 the trip arm 32 and the shaft 31 will normally be returned under the influence of spring 54 to the operative position occupied by these parts.

The plunger 20 at its end removed from the cylinder 19 is mounted in the guideway 42 as has been mentioned above. The adjusting nut 44 is threadedly engaged upon the part 43 of plunger 20 which extends beyond the guideway 42. It is apparent that by regulating the position of nut 44 on plunger part 43 the ultimate throw of the plunger 20 is determined and that at the same time the quantity of oil delivered by the device is adjustable as desired. Suitable means for locking the nut 44 on the threaded end part 43 of shaft 20 is provided such as a sleeve 45 integral with the nut 44, the sleeve being longitudinally slit in four places on two diameters at right angles to each other so as to permit a cotter pin 45a to be passed through a hole in the portion 43 of the plunger 20 to secure the nut 44 at any quarter turn thereof to maintain it in the desired adjusted position. The collar 46 is adjustably secured to the plunger 20 by screw 47 to furnish means for adjusting the tension of spring 48. The main spring 48 surrounding the plunger 20 bears at one end against collar 46 and at its other end against guideway 42.

The operation of the device shown in Figs. 1 to 5 is as follows: As the carriage to be oiled approaches the oiling station a part thereof engages trip arm 32 and rocks the same about the center of shaft 31 against the resistance of spring 48 until the arm has been moved out of the line of travel of the carrier when it disengages and moves back to its original position. The deflection of arm 32 from its original position causes through the train of linkage described above the plunger to be retracted in the cylinder 19 at the same time compressing spring 48. A partial vacuum is set up in the portion of the cylinder 19 between the reservoir 50 and the one-way valve until the end of plunger 20 has entered the reservoir 50. Thereupon oil rushes in from the reservoir to fill the chamber in cylinder 19 and the reservoir is refilled from the source of oil by line 29. When trip arm 32 has cleared the moving machinery the spring 48 forces the plunger 20 towards the one-way valve at the end of the cylinder. Since the spring 48 has been forcibly retracted, the spring 48 imparts a powerful throw of the plunger towards the one-way valve. The inertia of the plunger is sufficient to cause the spring 51 to be compressed. The extent of this throw and overthrow of the plunger 20 is limited by the positioning of the nut 44 so that the desired quantity of oil is discharged. Immediately after the discharge of the oil the spring 51 has become under sufficient compression to retract plunger 20 to the extent of the overthrow and move the plunger a slight distance in the opposite direction and away from the one-way valve. The plunger ultimately assumes a position such as the position shown in solid lines in Figs. 4 and 5. The remaining parts of the apparatus through the linkage above described return the trip arm to proper operative position for engaging a part of the next succeeding apparatus having a part to be lubricated. If the apparatus to be lubricated should be moved in a reverse direction, the trip arm is easily and yieldably moved out of the way as has been described above.

When it is desired to render the device inoperative, the arm 32 may be moved in a counter-clockwise direction to the position shown at 49 in Fig. 3. However, movement of the trip arm 32 in a counter-clockwise direction causes the oiling mechanism to be operated to discharge oil from the device. Therefore it is regarded as advantageous that the device made according to this invention may be moved in a clockwise direction until the trip arm assumes the position shown at 49. This movement is permitted due to the fact that the collar 52 is slidable on the link 36. Regardless of which way the trip arm 32 is moved to the inoperative position at 49 in Fig. 3, the linkage provided and the spring 48 hold the trip arm in the inoperative position shown so as to maintain it there against accidental displacement. In this position, namely, the inoperative position shown at 49 in Fig. 3, the trip arm 32 is out of the path of travel of the carriages on the conveyor system and the device is rendered inoperative and is securely maintained until it is desired to restore it to use. With the improved apparatus described herein the trip arm 32 can be moved to the inoperative position and returned to operative position without causing any discharge of oil from the apparatus, by compression of spring 54.

With the apparatus above described, the quantity of oil as well as the point at which the oil is discharged and the character of the stream of oil can be adjusted as desired.

A modified embodiment of this invention is shown in Fig. 6. In this embodiment of my invention the cylinder 19, plunger 20, spring 48, held on plunger 20 by collar 46 or the like, are the same as has been described above in connection with Figs. 1 to 5. Likewise the trip arm 32 operating through shaft 31, lever 35, and link 36, are the same as above described in connection with Figs. 1 and 5 and such parts of the mechanism shown in Figs. 1 to 5 as can be employed with the special features of my invention shown in Fig. 6 are to be regarded usable according to my invention with these features.

In Fig. 6 there is shown a modified form of tripping device whereby the actuation of plunger 20 is effected at any predetermined position along the arc of movement of trip arm 32, and without regard to the moment when said trip arm is disengaged by the carriage 13. This permits more accurate adjustment of the moment at which the oil is ejected, without regard to differences in size or shape between successive carriages 13 which might otherwise impair the accurate timing of the discharge. To this end the device is provided with a lever 58 pivoted at 59. One end of the lever 58 is pivotally attached to link 36. The other end of lever 58 carries a latch 60 pivoted at 61. In order to control the position of latch 60, the latch carries an ear 62 which is held between an adjustable set screw 63 on lever 58 and a yieldable L-shaped pawl 64 pivoted at 65. Attached to one arm of the pawl 64 is a spring 66 between the pawl and a pin 67 on plate 18. The tension of the spring 66 maintains the pawl 64 in position such that the pawl keeps the ear 62 of latch 60 against set screw 63 and keeps the latch yieldingly in protruded position. The tension on the parts can be adjusted as desired by securing the spring 66 to any of pins 67, 67a and 67b.

Attached to the plunger 20 by means of a set screw 68 is a collar block or other stop member 69. By adjusting the position of this stop the point at which the plunger is released from the latch can be adjusted.

Attached to the plate 18 is a stop bracket 70 having set screw 71 mounted therein and adapted to be maintained at any position by lock nut 72. The lever 58 is adapted to come in contact with the end of set screw 71 and to be maintained there by the spring 66.

The operation and function of the device shown in Fig. 6 is as follows: The trip arm 32 is adapted to come in contact with a part of the apparatus to be lubricated, such as the yoke 13. If the yoke 13 is in the proper lateral position with respect to the track 10, then the parts may be proportioned or adjusted so that the device will be tripped by yoke 13 passing beyond the point at which it is capable of holding the trip arm 32 out of its normal position. In such case the oil will be discharged on the bearing when the trip arm 32 is released and when the bearings are in proper position with respect to the oil discharge nozzles and it will not be necessary to have the parts tripped by the secondary tripping means shown and described in connection with Fig. 6.

If, however, the yoke 13 is at the position shown in dotted lines in Fig. 6, it is apparent that the tripping arm will not be released by the movement of the yoke 13 in the direction of the arrow until after the bearings to be lubricated have moved beyond the position for receiving accurately measured oil from nozzles 26a and 27a. In such case, the auxiliary tripping mechanism comes into play as the latch 60 which coacts with the block 69 is adapted to release the plunger 20 as soon as the lever 58 reaches the predetermined position at which oil is dischargeable accurately on the bearings and without regard to whether or not the arm 32 has disengaged from its contact with yoke 13. When the trip arm 32 is subsequently released from contact with the yoke 13, the trip arm 32 and associated parts including the lever 58 assume again their normal operative position under the influence of spring 66, the latch 60 being depressible as hereinabove described to permit this movement. If desired, the parts can be proportioned or adjusted so that the plunger 20 will always be released by latch 60 becoming disengaged from block 69.

It is an advantage of the modification of my invention shown in Fig. 6 that the oil may be ejected at a point along the arc of movement of arm 32 which is determined by the tripping of latch 60 from collar stop 69. This point may be adjustably predetermined by adjustment of set screws 63 or 68 or 71. It may, and often does, happen that certain carriages in the sequence will extend laterally of their path of travel farther than others. Such differences will vary the time of discharge of the oil, if such discharge depends on the tripping of arm 32 from its engagement with the carriage. The modification here disclosed eliminates such variations in the time of discharge of the oil, and furnishes means for an accurate timing of the discharge with resulting advantages which include more efficient operation, less wastage of oil and the like.

In Fig. 6, for further explanation, the carriage 13 is shown in dotted lines in two positions, one representing a carriage of less lateral extension, the other representing a carriage of greater lateral extension. As will be apparent from this representation, such differences in the lateral extension of the carriages will produce differences in the time of discharge of the oil, if tripping of arm 32 is relied upon to discharge the oil. The modification herein described in connection with Fig. 6 insures accuracy of timing of the discharge notwithstanding such differences in lateral extension of the carriages.

While I confine this description to certain specific embodiments of my invention, it is my belief that my invention may be modified in many ways and that it is suitable to other than the particular type of overhead conveyor system here used for purposes of illustration. I do not desire to be limited either to the particular form of oiling mechanism here shown or to oilers of the particular form of overhead conveyor system here shown but intend that my invention shall be taken as covering all forms of applications thereof which fall within the proper scope of the following claims.

I claim:

1. In apparatus of the character described, the combination with a plunger operated lubricant discharging mechanism of means for actuating said plunger comprising a spring adapted to actuate said plunger in a direction to discharge lubricant from said mechanism, means for retracting said plunger against the tension of said spring upon movement of said mechanism relative to apparatus having a part to be lubricated, means for releasing said plunger to be actuated by said spring when said apparatus is in a predetermined position with reference to said mechanism, means for limiting the movement of said plunger, and resilient means for moving said plunger backwardly after it has been moved to the limit of its motion under influence of said spring.

2. In apparatus of the character described the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon motion of said member relative to said mechanism, a pivoted lever, means for moving said lever about its pivot responsive to movement of said arm, means coacting between said lever and plunger for retracting said plunger upon movement of said lever responsive to movement of said arm, means for releasing said plunger to be actuated by said spring to discharge lubricant from said mechanism on a part to be lubricated of said apparatus when said part is in a predetermined position relative to said mechanism, a spring adapted to be brought under tension upon movement of said plunger to discharge oil from said mechanism and adapted to retract said plunger to normal position from the maximum displacement of said plunger due to actuation by said spring.

3. In apparatus of the character described a part having a bore with an outlet port, a plunger slidable in said bore to discharge lubricant from said bore through said outlet port, a one-way valve permitting lubricant to be discharged through said outlet port by said plunger, an inlet to said bore substantially removed from said outlet port, means for retracting said plunger to an extreme position away from said outlet port to be filled with oil from said inlet port, means including a spring for moving said plunger to an extreme position toward said outlet port to discharge lubricant from said bore, and means for maintaining said plunger in normal position intermediate said extreme position including said first-named spring and a second spring opposed thereto.

4. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, means for maintaining said arm in a normal position for actuation by said member, a pivoted lever, means for moving said lever responsive to movement of said arm when said arm is moved in one direction from normal position, means coacting between said lever and said plunger for retracting said plunger upon movement of said arm in said direction, and means interposed between said arm and said lever whereby said arm may be moved from normal position in the opposite direction without substantially moving said lever.

5. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, means for maintaining said arm in a normal position for actuation by said member, means responsive to movement of said arm in one direction to discharge lubricant from said mechanism, and means permitting said arm to be turned in the opposite direction to a position in which it is not adapted to be actuated by movement of said member relative to said mechanism, and means for maintaining said arm in said last-named position.

6. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, means whereby said movement of said arm results in discharge of lubricant from said mechanism, means including a yieldable member permitting said arm to be swung to inoperative positon so as not to be moved by movement of said member relative to said mechanism, and means including said first-named spring for maintaining said arm in inoperative position.

7. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, means for yieldingly maintaining said arm in normal position to be moved by said member, a pivoted lever, means for moving said lever in response to movement of said arm in one direction, and means cooperating between said lever and said plunger to retract said plunger against the force of said spring upon movement of said lever in response to movement of said arm, said last-named means being adapted to release said plunger to expel lubricant from said mechanism when said lever is moved to a predetermined extent about its pivot in response to movement of said arm.

8. In apparatus of the character described the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, means for yieldingly maintaining said arm in normal position to be moved by said member, a pivoted lever, means for moving said lever in response to movement of said arm in one direction, means cooperating between said lever and said plunger to retract said plunger against the force of said spring upon movement of said lever in response to movement of said arm, said last-named means being adapted to release said plunger to expel lubricant from said mechanism when said lever is moved to a predetermined extent about its pivot in response to movement of said arm, and means for adjusting the point in the movement of said lever at which said last-named means release said plunger.

9. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, a pivoted lever, means for moving said lever in response to movement of said arm in one direction, a yieldable latch adjacent an end of said lever adapted to engage a stop on said plunger to retract said plunger against the tension of said spring upon movement of said lever in response to movement of said arm, said latch being adapted to disengage said stop to expel lubricant from said mechanism upon movement of said lever in response to movement of said arm to a predetermined position, and resilient means for returning said lever and said arm to normal position such that said latch is adapted to re-engage said stop on said plunger, and said arm is adapted to be moved again upon movement of a member of apparatus having a part to be lubricated relative to said mechanism.

10. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, a pivoted lever, means for moving said lever in response to movement of said arm in one direction, a yieldable latch adjacent an end of said lever adapted to engage a stop on said plunger to retract said plunger against the tension of said spring upon movement of said lever in response to movement of said arm, said latch being adapted to disengage said stop to expel lubricant from said mechanism upon movement of said lever in response to movement of said arm to a predetermined position, means for adjusting the tension on said yieldable latch, and resilient means for returning said lever and said arm to normal position such that said latch is adapted to re-engage said stop on said plunger, and said arm is adapted to be moved again upon movement of a member of apparatus having a part to be lubricated relative to said mechanism.

11. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, a pivoted lever, means for moving said lever in response to movement of said arm in one direction, a yieldable latch adjacent an end of said lever adapted to engage a stop on said plunger to retract said plunger against the tension of said spring upon movement of said lever in response to movement of said arm, said latch being adapted to disengage said stop to expel lubricant from said mechanism upon movement of said lever in response to movement of said arm to a predetermined position, a second spring for returning said lever and said arm to normal position such that said latch is adapted to re-engage said stop on said plunger, and said arm is adapted to be moved again upon movement of a member of apparatus having a part to be lubricated relative to said mechanism, and means including said second spring for yieldably maintaining said latch in protruding position.

12. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, a pivoted lever, means for moving said lever in response to movement of said arm in one direction, a yieldable latch adjacent an end of said lever adapted to engage a stop on said plunger to retract said plunger against the tension of said spring upon movement of said lever in response to movement of said arm, said latch being adapted to disengage said stop to expel lubricant from said mechanism upon movement of said lever in response to movement of said arm to a predetermined position, resilient means for returning said lever and said arm to normal position such that said latch is adapted to re-engage said stop on said plunger, and said arm is adapted to be moved again upon movement of a member of apparatus having a part to be lubricated relative to said mechanism, spring means interposed between said arm and said lever permitting said arm to be swung in the reverse direction into inoperative position with respect to said member, and means including said spring means for maintaining said arm in inoperative position.

13. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said mechanism, a pivoted lever, means for moving said lever in response to movement of said arm in one direction, a yieldable latch adjacent an end of said lever adapted to engage a stop on said plunger to retract said plunger against the tension of said spring upon movement of said lever in response to movement of said arm, said latch being adapted to disengage said stop to expel lubricant from said mechanism upon movement of said lever in response to movement of said arm to a predetermined position, resilient means for returning said lever and said arm to normal position such that said latch is adapted to re-engage said stop on said plunger, and said arm is adapted to be moved again upon movement of a member of apparatus having a part to be lubricated relative to said mechanism, and means for adjusting the point at which said plunger is released by said latch.

14. In apparatus of the character described the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon relative movement of said member with respect to said mechanism, a pivoted lever, means for moving said lever in response to movement of said arm in one direction, means cooperating between said lever and said plunger to retract said plunger against the tension of said spring in response to movement of said arm, said means being adapted to release said plunger when said lever has been moved about its pivot to a predetermined extent, a stop for holding said lever in predetermined normal position for retracting said plunger, and resilient means for returning said lever to said stop after said lever has been moved responsive to movement of said arm to release said plunger, the connecting means between said lever and said arm being adapted to return said arm to normal operative position when said lever is returned to normal position against said stop.

15. In apparatus of the character described the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon relative movement of said member with respect to said mechanism, a pivoted lever, means for moving said lever in response to movement of said arm in one direction, means cooperating between said lever and said plunger to retract said plunger against the tension of said spring in response to movement of said arm, said means being adapted to release said plunger when said lever has been moved about its pivot to a predetermined extent, a stop for holding said lever in predetermined normal position for retracting said plunger, resilient means for returning said lever to said stop after said lever has been moved responsive to movement of said arm to release said plunger, the connecting means between said lever and said arm being adapted to return said arm to normal operative position when said lever is returned to normal position against said stop, and yieldable means adapted to permit said arm to be moved in reverse direction without substantially moving said lever.

16. In apparatus of the character described the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said part, a pivoted lever adapted to retract said plunger, a link interposed between said arm and said lever, a collar slidably arranged on said link, a stop preventing movement of said collar on said link, means responsive to movement of said arm in one direction to urge said collar against said stop to move said link, means connecting said link to said lever to move said lever upon movement of said arm in said direction, a second stop on said link on the other side of said collar, and a spring between said second stop and said collar permitting said collar to be yieldably slid along said link when said arm is moved in the reverse direction.

17. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus containing a part to be lubricated upon movement of said member relative to said part, a pivoted lever adapted to retract said plunger, a link interposed between said arm and said lever, a collar slidably arranged on said link, a stop preventing movement of said collar on said link, means responsive to movement of said arm in one direction to urge said collar against said stop to move said link, means connecting said link to said lever to move said lever upon movement of said arm in said direction, a second stop on said link on the other side of said collar, a spring between said second stop and said collar permitting said collar to be yieldably slid along said link when said arm is moved in the reverse direction, and means for adjusting the position of said first stop on said link.

18. In apparatus of the character described, the combination with a plunger operated lubricant discharging mechanism of means for actuating said plunger comprising a spring adapted to actuate said plunger in a direction to discharge lubricant from said mechanism, an arm adapted to be moved by a member of apparatus having a part to be lubricated upon movement of said member relative to said mechanism, a pivoted lever, means for moving said lever in response to movement of said arm when said arm is moved in one direction from normal position for being moved by said member, means coacting between said lever and said plunger for retracting said plunger upon movement of said lever responsive to movement of said arm in said direction, resilient means for returning said lever to normal position for retracting said plunger, means interposed between said arm and said lever for returning said arm responsive to said resilient means to normal position to be moved by said member, and means adapted to permit said arm to be yieldingly moved in the opposite direction from said normal position without substantially moving said lever and to return said arm to said normal position.

19. In apparatus of the character described a part having a bore with an outlet port, a plunger slidable in said bore to discharge lubricant from said bore through said outlet port, a one-way valve permitting lubricant to be discharged through said outlet port by said plunger, an inlet to said bore substantially removed from said outlet port, means for retracting said plunger to an extreme position away from said outlet port to be filled with oil from said inlet port, means including a spring for moving said plunger to an extreme position toward said outlet port to discharge lubricant from said bore, means for maintaining said plunger in normal position intermediate said extreme positions including said first-named spring and a second spring opposed thereto, and means for changing the relative tension of said springs.

MERLE F. LEACH.